No. 740,330. PATENTED SEPT. 29, 1903.
L. M. STIREWALT.
HAT.
APPLICATION FILED APR. 20, 1903.
NO MODEL. 3 SHEETS—SHEET 1.
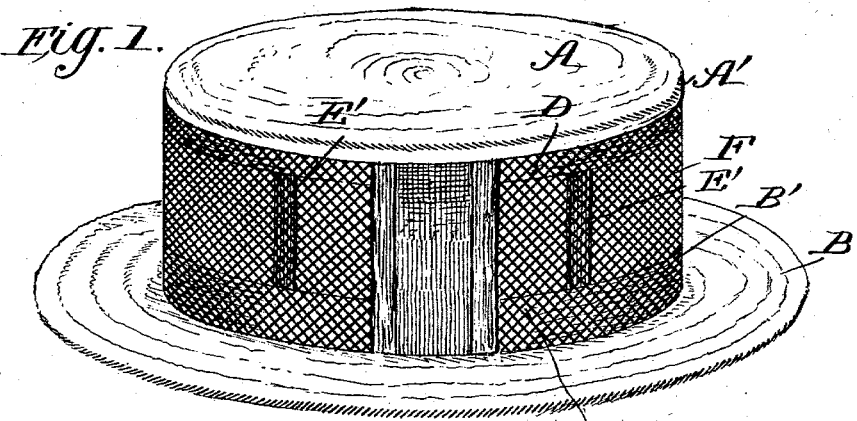
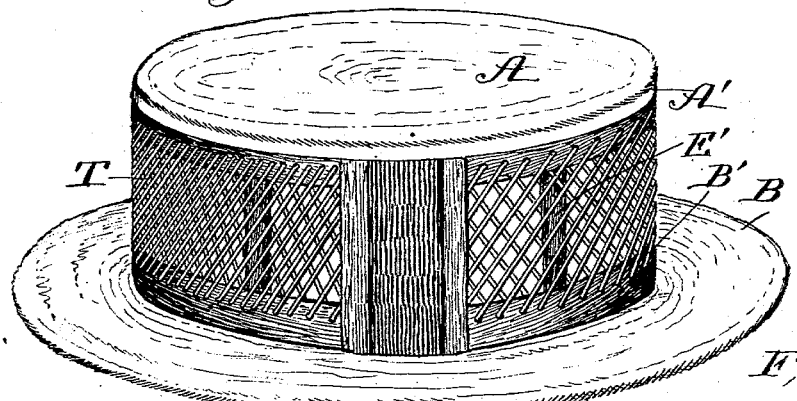
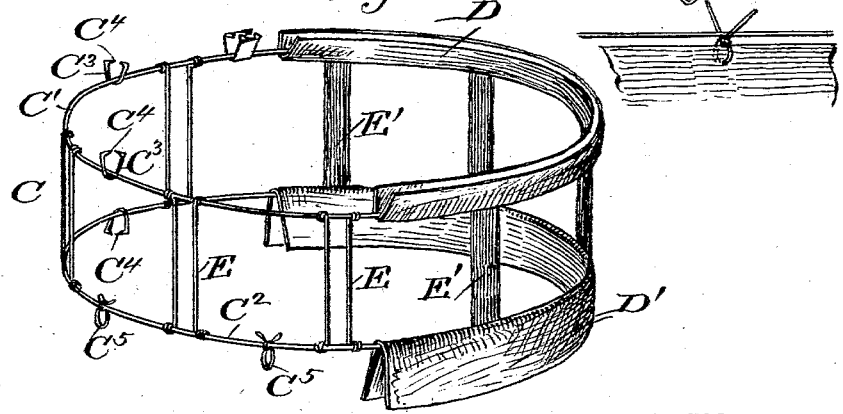
WITNESSES:
Jos. A. Ryan
Perry B. Turpin
INVENTOR
Luther M. Stirewalt.
BY Munn & Co.
ATTORNEYS.

No. 740,330. PATENTED SEPT. 29, 1903.
L. M. STIREWALT.
HAT.
APPLICATION FILED APR. 20, 1903.
NO MODEL. 3 SHEETS—SHEET 2.
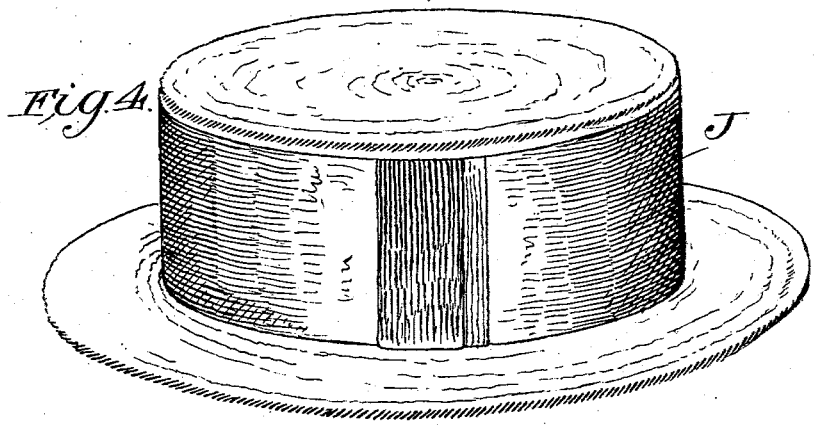
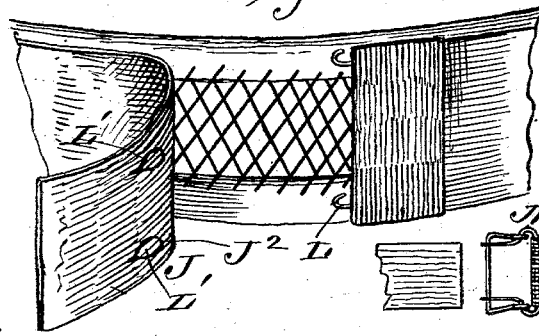
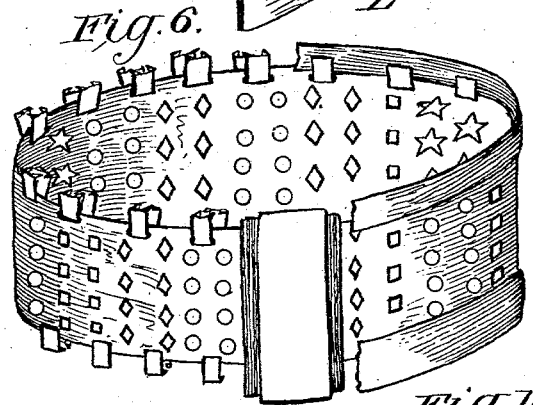
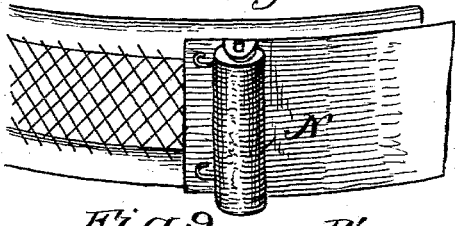
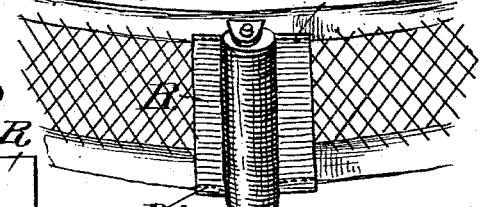
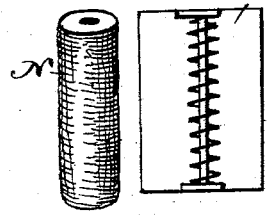
WITNESSES:
Jos. A. Ryan
Perry B. Lupin
INVENTOR
Luther M. Stirewalt
BY Munn & Co.
ATTORNEYS.

No. 740,330. PATENTED SEPT. 29, 1903.
L. M. STIREWALT.
HAT.
APPLICATION FILED APR. 20, 1903.
NO MODEL. 3 SHEETS—SHEET 3.
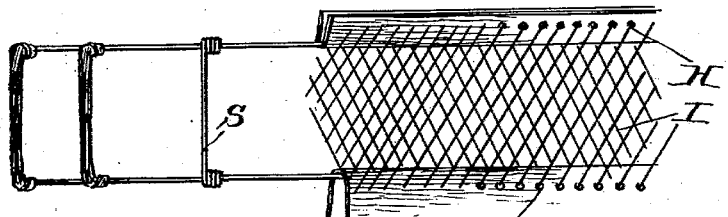
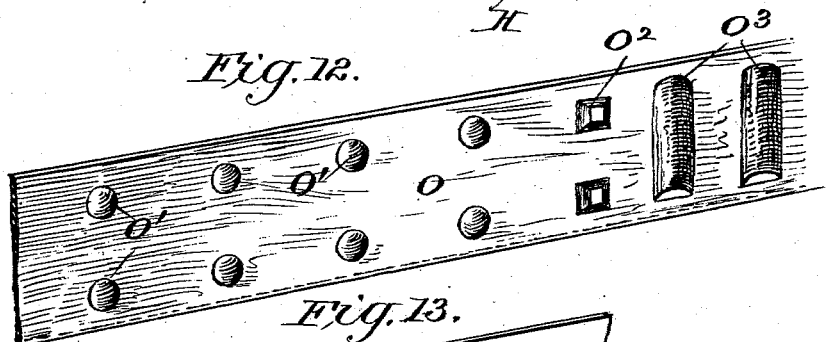
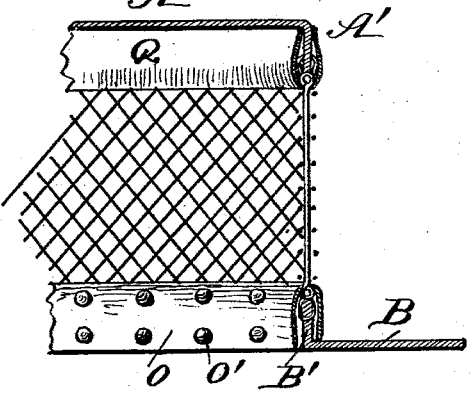
WITNESSES
Jos. A. Ryan
Perry B. Turpin
INVENTOR
Luther M. Stirewalt.
BY Munn & Co.
ATTORNEYS.

No. 740,330.

Patented September 29, 1903.

UNITED STATES PATENT OFFICE.

LUTHER M. STIREWALT, OF TOLEDO, OHIO.

HAT.

SPECIFICATION forming part of Letters Patent No. 740,330, dated September 29, 1903.

Application filed April 20, 1903. Serial No. 153,442. (No model.)

*To all whom it may concern:*

Be it known that I, LUTHER M. STIREWALT, a citizen of the United States, and a resident of Toledo, in the county of Lucas and State of Ohio, have made certain new and useful Improvements in Hats, of which the following is a specification.

My invention is an improvement in hats, in which I would include caps and similar head-coverings; and the invention has for an object to provide a novel construction of ventilated hats aiming to avoid baldness and other injuries which result from the wearing of air-tight unventilated hats; and the invention consists in certain novel constructions and combinations of parts, as will be hereinafter described and claimed.

In the drawings, Figure 1 is a perspective view of the hat ready for use. Fig. 2 is a perspective view of a hat, showing the lacing at the front as of a finer or closer mesh than at the back of the hat. Fig. 3 is a detail perspective view of the connecting-frame, the netting being removed. Fig. 3ª is a detail view illustrating an arrangement of two knots in tying the connecting-frame to the hat-sections. Fig. 4 is a perspective view of the hat with the cover-band applied. Fig. 5 is a detail perspective view of a portion of the netting or covering of the hat with the cover-band separated at its ends and one end slightly turned back. Fig. 6 is a perspective view showing a somewhat different form of connecting-frame from that shown in Fig. 3. Fig. 7 illustrates a somewhat different form of fastening for connecting the ends of the covering-band. Figs. 8 and 9 are perspective views illustrating a roller for supporting the covering-band, the band in Fig. 9 being wound entirely on the roller, while in Fig. 8 it is partly wound thereon. Fig. 10 is a detail view illustrating the roller and its shaft and spring. Fig. 11 is a detail side view of the connecting-frame, partly broken away, showing the netting extending between the upper and lower bindings instead of overlapping such parts, as shown in Fig. 1. Fig. 12 is a detail perspective view of a portion of an embossed sweat-band. Fig. 13 is a detail perspective view of a section of an ordinary plain sweat-band; and Fig. 14 is a vertical section of one edge of the hat, showing the embossed sweat-band.

It is well understood that the wearing of hats is a fertile cause of baldness, as those nations that do not wear hats are practically exempt from baldness, and I therefore provide a novel construction of hat in which the air will have free access to the scalp and hair, and so prevent the heating of the head and the loss of the hair from such cause as well as from the lack of pure air.

In carrying out my invention I make my hat with a top section A and a brim-section B, the section A having a short depending rim or flange A' and the brim B having a short upwardly-projecting rim or flange B', as will be understood from Figs. 1 and 14.

The top section A and base or rim section B are connected by the frame C, which, as shown in Fig. 3, includes the upper and lower rings C' and C², of wire or other suitable material, provided each with clasps C³, which may be engaged with rims A' and B' by pressing the spurs C⁴ of said clasps into the said rims at the opposite sides thereof, in which position they will be secured by the bindings D and D', which fit over the said clasps and embrace the rings C' and C² and extend thence along the inner and outer sides of the rims A' and B' and may be stitched to both said rims, thus operating to secure rings C' and C² to the rims and also to retain the clasps in engagement with their respective rims, thus anchoring the frame between the top and base sections of the hat. The top and base rings C' and C² are connected by the posts, which may consist of the wire standards E, which extend between the upper and lower rings and are secured to the same, as will be understood from Fig. 3. In Fig. 3 I show the posts arranged in pairs, and when so arranged I prefer to use a single covering E', of any suitable textile or other material, to cover both said posts and present the appearance of a single solid post. While it may be preferred to employ the standards E in pairs, it will be understood that the posts may be composed of single standards or, in other words, that one of the standards in each pair may be omitted.

When the hat is made with the top and base sections united by the connecting-frame, as before described, it will be understood that ample ventilation is provided entirely around the crown of the hat, and it will be desirable in some instances to wear the hat when so constructed; but I prefer for sake of appearances and to also provide a better mechanical connection between the upper and lower sections of the hat to provide a netting to extend over the open space between the top and base sections of the hat, as shown in Figs. 1, 2, and 5.

In Fig. 1 the netting F is represented as extending over the upper and lower bindings D and D' and to the upper and lower edges thereof, so it can be conveniently secured by stitching or in other suitable manner, and this netting may be any suitable woven or knitted construction or net produced in any manner of silk, cotton, or any other suitable material or substance to provide a foraminous covering for the space between the crown-sections. It will also be understood that when the netting extends over the bindings D and D' it may be conveniently secured by stitching through the said parts. However, it may in some instances be desired to simply extend the netting between the opposite bindings D and D' and secure it to the adjacent edges of said parts, as shown in Figs. 2, 5, 8, and 9.

In Fig. 11 I show a still different construction, wherein the netting is secured by providing eyelets H in the upper and lower sections of the hat and forming the netting by means of lacing I, passed through the eyelets, as shown in said Fig. 11. By this netting F or I, I secure a foraminous covering for the space between the upper and lower sections of the hat, as will be understood from the drawings.

It sometimes becomes desirable to close the open space in the hat, and for this purpose I provide a covering-band J, which is shown in detail in Fig. 5 and applied to the hat in Fig. 4. This band J may be of any suitable material and is provided near its ends with hooks L and eyes L', by which it may be secured upon the hat. When the covering-band J is not in use, it may be compactly folded and suitably held within the hat. It will be understood by this construction I provide a hat which will afford ample ventilation and which can be readily inclosed by the cover-band J whenever desired.

Instead of securing the cover-band by the hooks and eyes, as shown at Fig. 5, I may employ the buckle construction shown at M in Fig. 7 for securing the cover-band, or the cover-band may be wound on a spring-roller, as shown at N in Figs. 8 and 9, so the band can be wound off the roller for use around the hat, the roller being arranged at one side of the hat, and can be suitably wound on the roller when it is not in use.

In Fig. 6 I show the connecting-frame for the sections A and B of the hat as constructed from a band of compressed paper, celluloid, leather, tin, or other suitable material covered over with thin cloth, pasted on both sides securely to give it the appearance of cloth and being punched through at intervals with holes of any size and shape for the air to pass through. If desired, the front portion of this connection may be imperforate. In this Fig. 6 I also show clasps of tin or other metal to hold the bands above and below, the clasps being arranged to be pressed together upon the flanges of the sections A and B.

In the sectional Fig. 14 I illustrate the embossed sweat-band O, which is illustrated in detail in Fig. 12, and may be used, if desired, in lieu of the plain sweat-band P, which latter may be employed whenever desired. At Q in Fig. 14 I show a part of the lining of the hat that may be used, if desired, to cover the upper ends of the cords and binding. It will also be noticed from Fig. 14 that the lacing-cords may run part on the inside and part on the outside of the frame C.

In Fig. 9 I show at R plates of tin covered with cloth to give it the appearance of cloth and secured permanently to the hat by a strong thread at R' and forming a support for the spring-roller devices.

In Fig. 11 I show at S posts connecting the upper and lower rings of the connecting-frame and consisting of single wires covered with any preferred form of cloth.

In Fig. 12 and also in Fig. 14 I show an embossed sweat-band having raised or embossed portions $O'$, $O^2$, or $O^3$, which may be pressed into the band and filled from the outer side by a piece of felt, cork, or other suitable material fitting accurately into the embossed portions. These embossed or projecting portions may be of any suitable shape and arranged at intervals around the band, the purpose being to aid circulation of the blood to the hair by permitting the blood to pass up between the embossed or projecting portions instead of having a continuous binding of the head.

The lacing or netting may be made closer at any point desired, especially in front of the hat, as shown at T in Fig. 2, to prevent in a measure the forehead showing through the openings in the hat.

Instead of clasps $C^3$ for securing the connecting-frame to the sections A and B of the hat the said frame may be tied to the hat-sections by means of cords, as shown at $C^5$ in Fig. 3, or cords may be used in connection with the clasps whenever desired.

Cords $C^5$, as shown in Fig. 3, may be sewed through the sections of hat twice at two intervals, one stitch above the other, before forming the knot around the wire frame, if desired.

Clasps such as shown in Fig. 6 may be used in Fig. 3, if desired, and I have illustrated such clasps in the said figure.

The bindings D and D' (shown in Fig. 3)

may be doubly thick all the way around the hat in the center, where it touches the wires, so as to make the edge even, as it may not be smooth where the posts join the wire.

The cord, as shown in Fig. 3, may be tied in a knot first on the edge of the hat-section. Then the wire is placed on and another knot is tied above and on the wire frame. Thus two knots are tied, as will be understood from Fig. 3ª of the drawings.

Having thus described my invention, what I claim as new, and desire to secure by Letters Patent, is—

1. A hat substantially as herein described comprising the top section having the depending rim, the base-section having the upwardly-projecting rim, the connecting-frame having the upper and lower rings provided with the clasps to embrace the upper and lower rims, the posts connecting the upper and lower rings, and the bindings embracing the upper and lower rings and extending thence over the upper and lower rims and secured substantially as and for the purpose set forth.

2. A hat comprising upper and lower crown-sections, a circumferentially-extending frame between and connecting the said crown-sections, and a foraminous covering for the space between the crown-sections substantially as set forth.

3. The combination with the upper and lower sections and the rims thereof, of the connecting-frame having upper and lower rings and the bindings embracing said rings and fitting over and secured to the rims, and the foraminous covering for the space between the upper and lower sections substantially as set forth.

4. A hat composed of upper and lower sections and a frame connecting the same and having upper and lower rings and posts connecting the same and arranged in pairs substantially as set forth.

5. The combination with the upper and lower sections and the frame connecting the same, of the bindings fitting over the said frame and the upper and lower sections, and the lacing covering the space between the upper and lower sections and overlapping the bindings substantially as set forth.

6. The combination in a hat of the upper and lower sections spaced apart, the connecting-frame extending longitudinally between said sections and circumferentially around the crown of the hat, and the netting extending over said frame and covering the space between the sections substantially as set forth.

7. A hat having its crown provided with a foraminous ventilating-section, and a cover permanently connected at one end with the hat and arranged to be disposed to cover the ventilating-section thereof whenever desired substantially as set forth.

8. A ventilated hat comprising the upper and lower sections, the connecting-frame having upper and lower rings provided with fastening devices for securing it to the upper and lower sections of the hat, and the foraminous covering for the space between the upper and lower sections substantially as set forth.

9. A ventilated hat having its crown provided with a foraminous section, a covering-band for said section, and a spring-roller connected with the hat and to which one end of the covering-band is secured whereby the covering-band is permanently secured at one end in connection with the hat and may be adjusted to cover the foraminous section of the hat substantially as set forth.

LUTHER M. STIREWALT.

Witnesses:
SARAH A. FILDES,
ANNA FILDES.